US012334823B2

(12) United States Patent
Yoo et al.

(10) Patent No.: US 12,334,823 B2
(45) Date of Patent: Jun. 17, 2025

(54) DC-DC BUCK CONVERTER AND OPERATING METHOD THEREOF

(71) Applicant: SAMSUNG ELECTRONICS CO., LTD., Suwon-si (KR)

(72) Inventors: Sungmin Yoo, Seoul (KR); Hyungmin Lee, Seoul (KR); Woojoong Jung, Seoul (KR); Taehwang Kong, Suwon-si (KR); Junhyeok Yang, Seoul (KR); Yunho Lee, Seoul (KR)

(73) Assignees: SAMSUNG ELECTRONICS CO., LTD., Suwon-si (KR); KOREA UNIVERSITY RESEARCH AND BUSINESS FOUNDATION, Seoul (KR)

( * ) Notice: Subject to any disclaimer, the term of this patent is extended or adjusted under 35 U.S.C. 154(b) by 594 days.

(21) Appl. No.: 17/828,829

(22) Filed: May 31, 2022

(65) Prior Publication Data
US 2022/0385186 A1    Dec. 1, 2022

(30) Foreign Application Priority Data

Jun. 1, 2021    (KR) .................. 10-2021-0070890

(51) Int. Cl.
*H02M 3/158*    (2006.01)
(52) U.S. Cl.
CPC .................. *H02M 3/158* (2013.01)
(58) Field of Classification Search
CPC .................................................. H02M 3/158
See application file for complete search history.

(56) References Cited

U.S. PATENT DOCUMENTS

| 8,198,881 B2 | 6/2012 | Tsukamoto | |
|---|---|---|---|
| 8,866,450 B2 | 10/2014 | Kirchner | |
| 10,498,322 B1* | 12/2019 | Ebihara | H04N 25/616 |
| 10,756,624 B2 | 8/2020 | Mauri | |
| 10,790,742 B1 | 9/2020 | Petersen | |
| 10,811,974 B1 | 10/2020 | Petersen | |
| 11,456,663 B2* | 9/2022 | Petersen | H02M 1/0095 |
| 2013/0147543 A1* | 6/2013 | Dai | H02M 3/07 327/536 |
| 2017/0244318 A1* | 8/2017 | Giuliano | H02M 3/07 |

(Continued)

OTHER PUBLICATIONS

Yeunhee Huh et al., "A Hybrid Structure Dual-Path Step-Down Converter With 96.2% Peak Efficiency Using 250-mΩ Large-DCR Inductor", IEEE Journal of Solid-State Circuits, vol. 54, Issue 4, DOI: 10.1109/JSSC.2018.2882526, 2019, 10 pages total.

*Primary Examiner* — Rafael O De Leon Domenech
(74) *Attorney, Agent, or Firm* — Sughrue Mion, PLLC (57) ABSTRACT

A DC-DC buck converter for generating an output voltage by stepping down an input voltage includes a converting circuit including a plurality of transistors, a first capacitor, a second capacitor, and an inductor, the converting circuit being configured to form a current path that varies according to a plurality of modes and a plurality of phases; and a control circuit configured to: determine a mode of the converting circuit, from among the plurality of modes, according to a first amplitude of the input voltage and a second amplitude of the output voltage, and determine an ON/OFF state of each transistor of the plurality of transistors according to the determined mode and a phase from among the plurality of phases.

20 Claims, 12 Drawing Sheets

(56) References Cited

U.S. PATENT DOCUMENTS

| | | | |
|---|---|---|---|
| 2018/0175726 A1* | 6/2018 | Petersen | H02M 3/158 |
| 2020/0106358 A1 | 4/2020 | Cho et al. | |
| 2020/0321860 A1 | 10/2020 | Amin et al. | |
| 2020/0328675 A1 | 10/2020 | Seo et al. | |
| 2023/0387800 A1* | 11/2023 | Govindarajulu | H02M 3/1582 |

* cited by examiner

DC-DC BUCK CONVERTER AND OPERATING METHOD THEREOF

CROSS-REFERENCE TO RELATED APPLICATION

This application is based on and claims priority under 35 U.S.C. § 119 to Korean Patent Application No. 10-2021-0070890, filed on Jun. 1, 2021, in the Korean Intellectual Property Office, the disclosure of which is incorporated by reference herein in its entirety.

BACKGROUND

The present disclosure relates to a DC-DC converter, and more particularly, to a DC-DC buck converter for converting a high DC voltage into a low DC voltage and an operating method thereof.

Buck converters for converting a high DC voltage into a low DC voltage are important components in electronic devices that require an appropriate voltage input. DC-DC buck converters may be used in various fields such as mobile devices, Internet of Things (IoT) devices, memories, power management integrated circuits (PMICs), or battery chargers. In particular, devices using a battery use limited power, and thus, it is necessary to convert and use limited energy with high efficiency. Therefore, the role of a buck converter is important.

SUMMARY

Example embodiments provide a DC-DC buck converter that converts a DC voltage with high efficiency even when there is a significant difference between an input voltage and an output voltage, and an operating method thereof.

According to an aspect of an example embodiment, there is provided a DC-DC buck converter for generating an output voltage by stepping down an input voltage, the DC-DC buck converter including: a converting circuit including a plurality of transistors, a first capacitor, a second capacitor, and an inductor, the converting circuit being configured to form a current path that varies according to a plurality of modes and a plurality of phases; and a control circuit configured to: determine a mode of the converting circuit, from among the plurality of modes, according to a first amplitude of the input voltage and a second amplitude of the output voltage, and determine an ON/OFF state of each transistor of the plurality of transistors according to the determined mode and a phase from among the plurality of phases.

According to an aspect of an example embodiment, there is provided a DC-DC buck converter including: a first transistor connected between an input power source and a first node; a second transistor connected between the first node and a second node; a third transistor connected between the second node and a switching node; a fourth transistor connected between the switching node and a ground node; a fifth transistor connected between a third node and the ground node; a sixth transistor connected between the third node and a fourth node; a seventh transistor connected between the fourth node and a fifth node; an eighth transistor connected between the fifth node and the ground node; a first capacitor connected between the second node and the fifth node; a second capacitor connected between the first node and the third node; and an inductor connected between the switching node and an output node.

According to an aspect of an example embodiment, there is provided a method of operating a DC-DC buck converter generating an output voltage by stepping down an input voltage, the method including: inputting the input voltage to a converting circuit, the converting circuit including a plurality of transistors, a first capacitor, a second capacitor, and an inductor; and operating the converting circuit in any one of a first mode or a second mode based on the input voltage and the output voltage of the converting circuit, wherein operating includes operating based on a first phase and a second phase as a first period in the first mode, and operating based on a plurality of phases including the first phase, the second phase, and a third phase, as a second period, in the second mode.

BRIEF DESCRIPTION OF THE DRAWINGS

The above and other aspects, features, and advantages of certain example embodiments of the present disclosure will be more apparent from the following detailed description taken in conjunction with the accompanying drawings, in which.

DETAILED DESCRIPTION OF THE EMBODIMENTS

Hereinafter, example embodiments will be described in detail with reference to the accompanying drawings.

Figure 1:
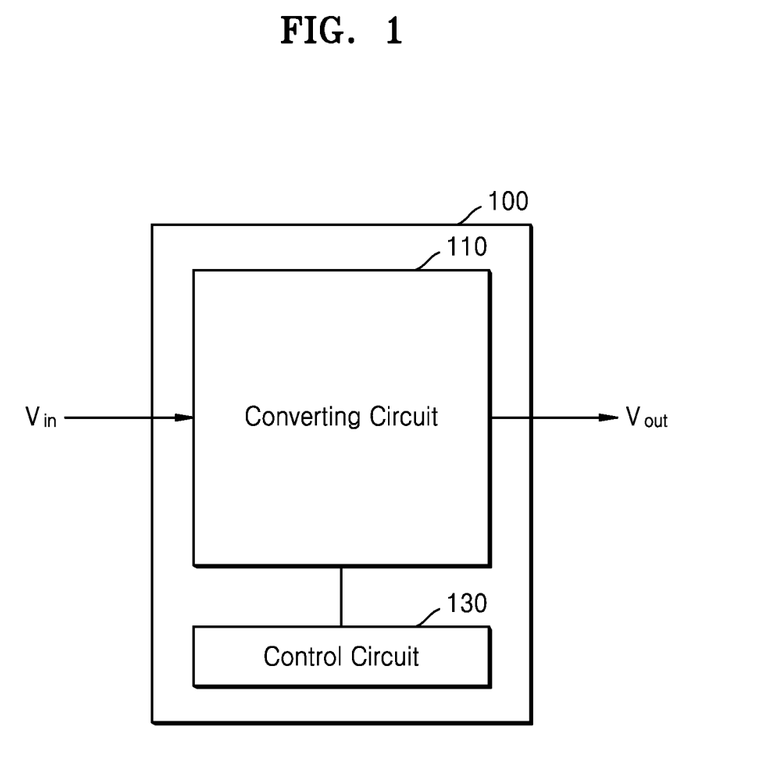
FIG. 1 is a block diagram illustrating a DC-DC buck converter according to an example embodiment.

FIG. 1 is a block diagram illustrating a DC-DC buck converter 100 according to an example embodiment.

Referring to FIG. 1, the DC-DC buck converter 100 according to the example embodiment may include a converting circuit 110 and a control circuit 130.

The converting circuit 110 may be a circuit configured to receive an input voltage $V_{in}$ from an input power source and output an output voltage $V_{out}$ having a voltage level lower than that of the input voltage $V_{in}$. For example, in an Internet of Things (IoT) device using a battery, the input power source may be a lithium-ion (Li-ion) battery, and the input voltage $V_{in}$ may be a voltage corresponding to about 2.7V to 4.2V. Also, the output voltage $V_{out}$ is lower than the voltage level of the corresponding input voltage and may vary depending on a semiconductor device receiving the corresponding output voltage $V_{out}$.

The control circuit 130 may be a circuit configured to control the converting circuit 110. For example, the control circuit 130 may be a circuit configured to control an operation of the converting circuit 110, such as determining a mode and a phase in which the converting circuit 110 operates.

Figure 2:
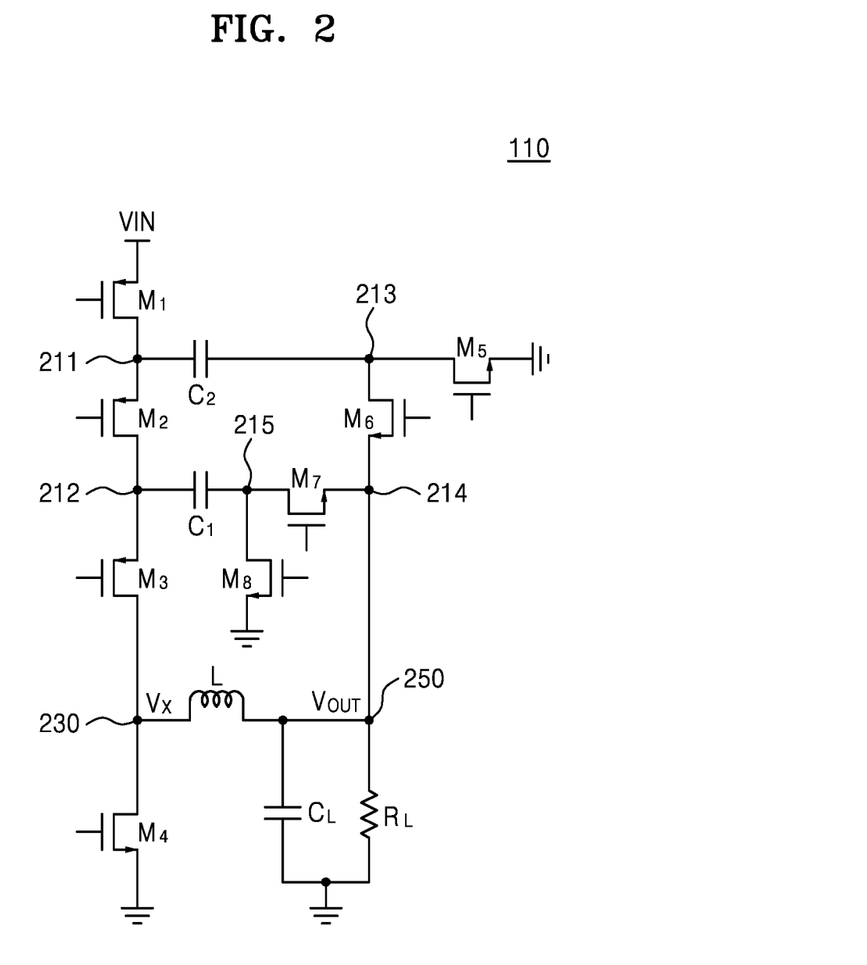
FIG. 2 is a view illustrating a converting circuit according to an example embodiment.

FIG. 2 is a diagram illustrating the converting circuit 110 according to an example embodiment.

Referring to FIG. 2, the converting circuit 110 according to the example embodiment may include a plurality of transistors $M_1$ to $M_8$, a first capacitor $C_1$, a second capacitor $C_2$, and an inductor L.

For example, the converting circuit 110 may include a first transistor $M_1$ connected between an input power source $V_{IN}$ and a first node 211, a second transistor $M_2$ connected between the first node 211 and a second node 212, a third transistor $M_3$ connected between the second node 212 and a switching node 230, a fourth transistor $M_4$ connected between the switching node 230 and a ground node, a fifth transistor $M_5$ connected between a third node 213 and the ground node, a sixth transistor $M_6$ connected between the third node 213 and a fourth node 214, a seventh transistor $M_7$ connected between the fourth node 214 and a fifth node 215, an eighth transistor $M_8$ connected between the fifth node 215 and the ground node, a first capacitor $C_1$ connected between the second node 212 and the fifth node 215, a second capacitor $C_2$ connected between the first node 211 and the third node 213, and an inductor L connected between the switching node 230 and an output node $V_{OUT}$ 250.

In addition, the converting circuit 110 may include a third capacitor $C_L$, and a resistor $R_L$.

The first transistor $M_1$, the second transistor $M_2$, and the third transistor $M_3$ may each be configured as a PMOS. In addition, the fourth transistor $M_4$, the fifth transistor $M_5$, the sixth transistor $M_6$, the seventh transistor $M_7$, and the eighth transistor $M_8$ may each be configured as NMOS, but a configuration of each of a plurality of transistors is not limited to the above.

Figure 3:
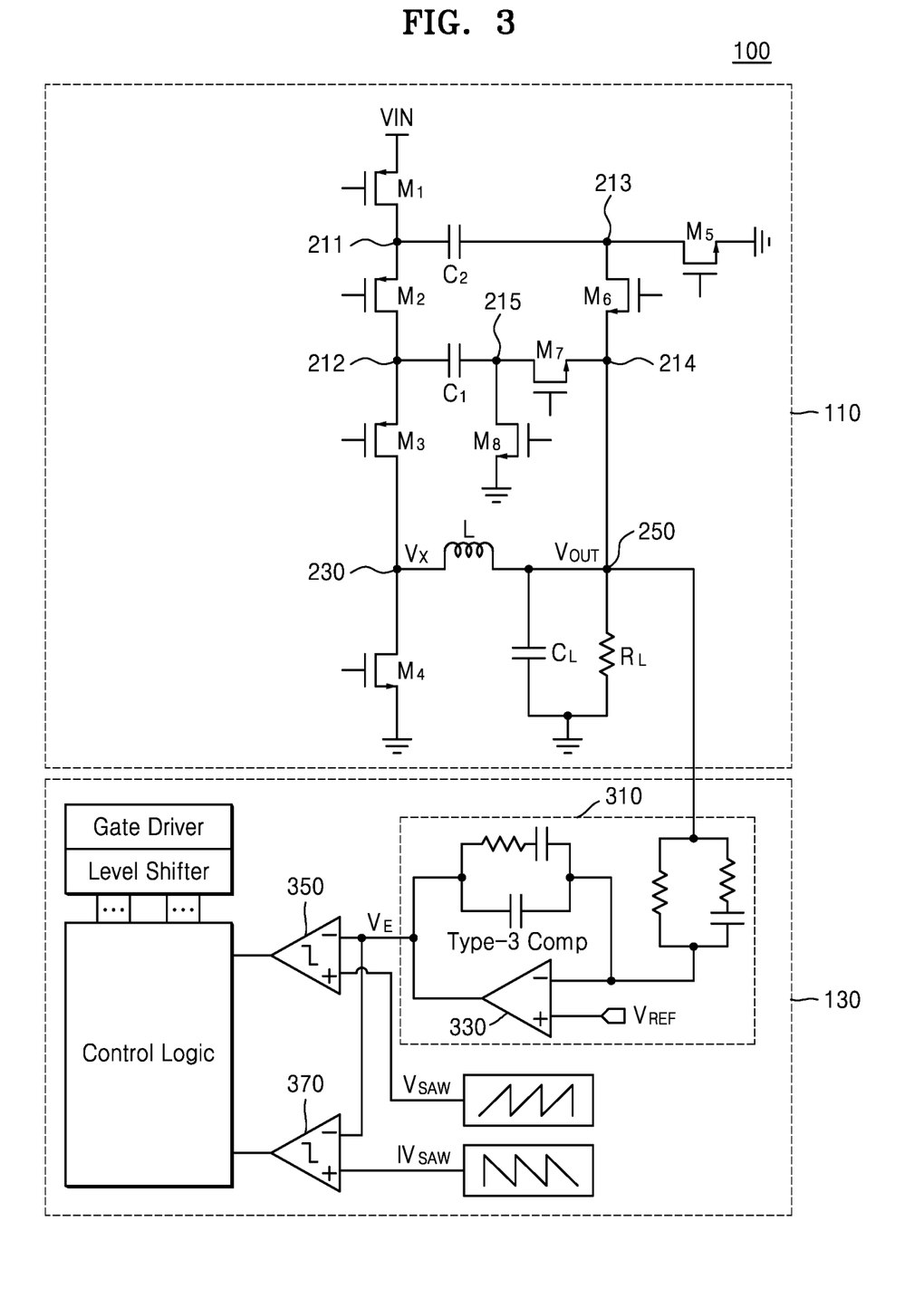
FIG. 3 is a circuit diagram illustrating a DC-DC buck converter according to an example embodiment.

FIG. 3 is a circuit diagram illustrating a DC-DC buck converter 100 according to an example embodiment.

Referring to FIG. 3, the DC-DC buck converter 100 according to the example embodiment may include a converting circuit 110 and a control circuit 130.

The converting circuit 110 of FIG. 3 has a component corresponding to the converting circuit 110 of FIG. 2, and may be configured to be the same as the converting circuit 110 of FIG. 2.

The control circuit 130 may be a circuit configured to control an operation of the converting circuit 110. The control circuit 130 may be configured to control the operation of the converting circuit 110 based on an input voltage $V_{IN}$, an output voltage $V_{OUT}$, or a voltage $V_X$ of a switching node of the converting circuit 110. For example, the control circuit 130 may be configured to determine a mode or a phase of the converting circuit 110.

The control circuit 130 may include a compensator 310, a first comparator 350, and a second comparator 370.

Also, the control circuit 130 may include a control logic, a level shifter, and a gate driver. In addition, the control circuit 130 may further include other components for controlling the converting circuit 110, and is not limited to those shown in FIG. 3.

The compensator 310 may be an element for controlling a function of a circuit having a plurality of variables. The compensator 310 may include a resistor, a capacitor, and an error amplifier 330, and may be connected to the converting circuit 110.

The error amplifier 330 may be an element for amplifying and outputting a difference voltage between an input voltage value and a reference voltage value $V_{REF}$.

The first comparator 350 and the second comparator 370 may be elements for comparing two input signals, respectively.

The first comparator 350 may be configured to receive a reference signal, and the second comparator 370 may be configured to receive an inverted reference signal having a vertically inverted waveform based on a waveform of the reference signal. Also, the first comparator 350 and the second comparator 370 may each be configured to receive an output signal $V_E$ from the error amplifier 330.

For example, the reference signal may be a sawtooth-shaped signal $V_{SAW}$. Accordingly, the first comparator 350 may be configured to receive the sawtooth-shaped signal $V_{SAW}$ and an output signal $V_E$ from the error amplifier 330.

Also, the inverted reference signal may be an inverted sawtooth-shaped signal $IV_{SAW}$. Accordingly, the second comparator 370 may be configured to receive the inverted sawtooth-shaped signal $IV_{SAW}$ and the output signal VE from the error amplifier 330. The inverted sawtooth-shaped signal $IV_{SAW}$ may be a signal having a vertically inverted waveform based on a waveform of the sawtooth-shaped signal $V_{SAW}$.

The control circuit 130 may be configured to determine a phase of the converting circuit 110 based on the sawtooth-shaped signal $V_{SAW}$, the inverted sawtooth-shaped signal $IV_{SAW}$, and the output signal $V_E$ from the error amplifier 330.

Also, the control circuit 130 may be configured to determine a mode of the converting circuit 110 based on the sawtooth-shaped signal $V_{SAW}$, the inverted sawtooth-shaped signal $IV_{SAW}$, and the output signal $V_E$ from the error amplifier 330. A detailed operation method of the DC-DC buck converter 100 according to an example embodiment will be described later.

Figure 4A:
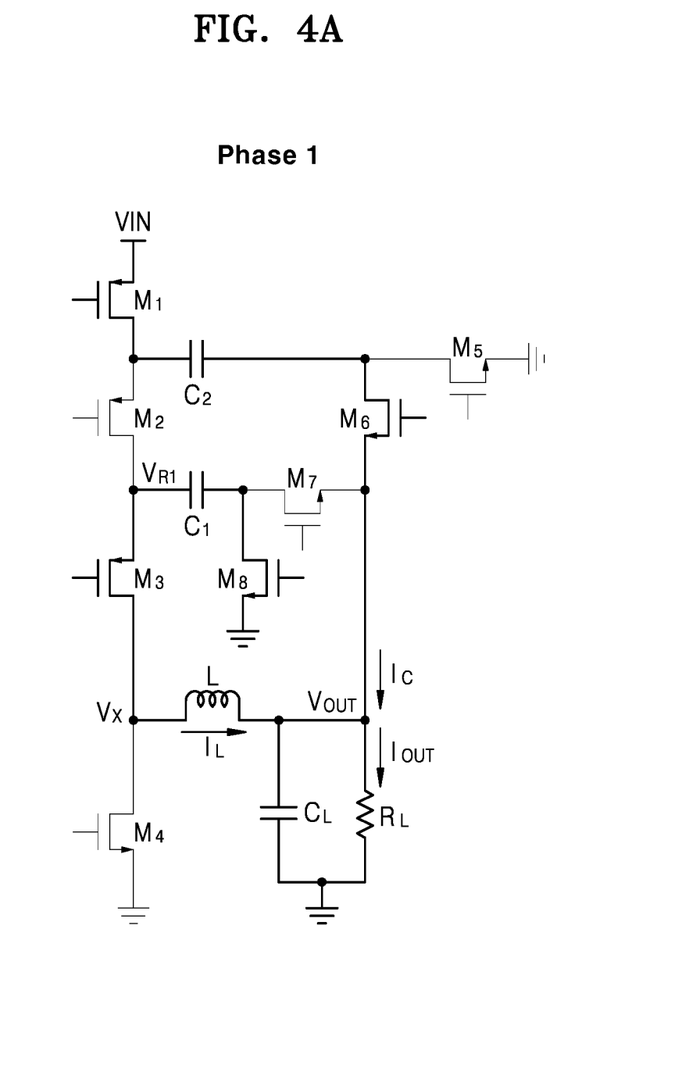
FIGS. 4A, 4B, and 4C are circuit diagrams illustrating phases of a DC-DC buck converter according to an example embodiment.
Figure 4B:
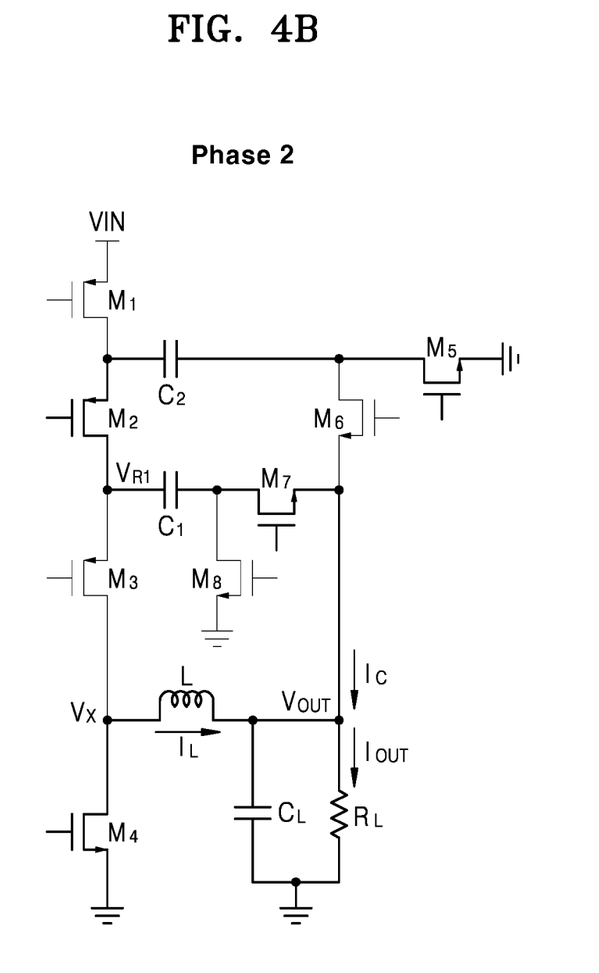
Figure 4C:
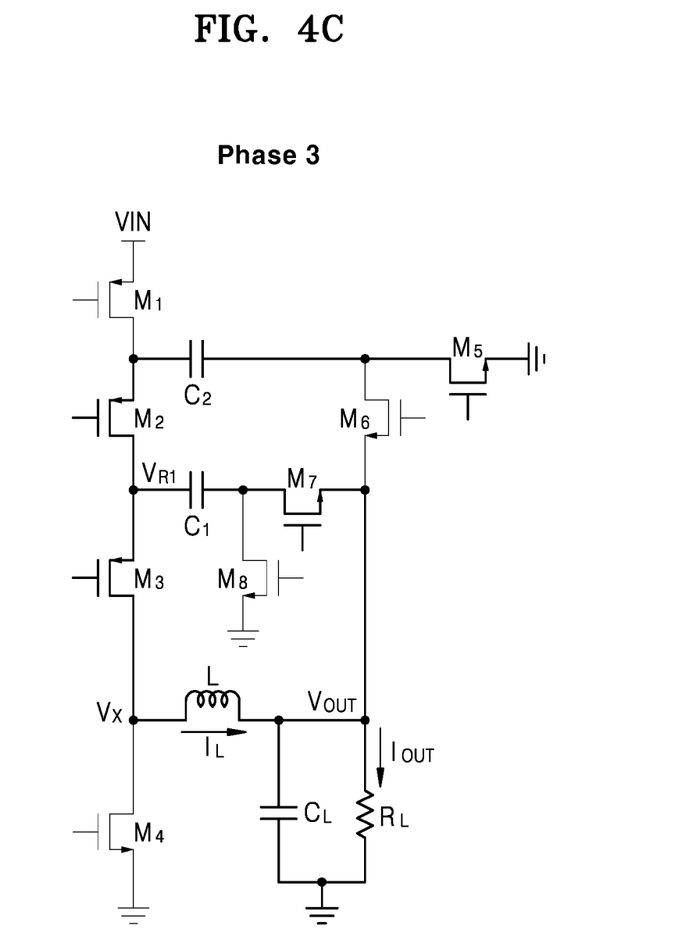

FIGS. 4A, 4B, and 4C are circuit diagrams illustrating phases of a DC-DC buck converter according to an example embodiment.

The converting circuit according to an example embodiment may be configured to operate in any one of a first phase (phase 1), a second phase (phase 2), and a third phase (phase 3) illustrated in FIGS. 4A, 4B, and 4C, respectively. The converting circuit may be configured to output an output current $I_{OUT}$ using the first capacitor $C_1$, the second capacitor $C_2$, and the inductor L in each of the first phase, the second phase, and the third phase.

Also, the converting circuit may be configured to operate in either the first mode or the second mode.

In an example embodiment, the first mode may be a mode in which the converting circuit operates in any one of the first phase and the second phase.

Also, the second mode may be a mode in which the converting circuit operates in any one of the first phase, the second phase, and the third phase. Accordingly, in the second mode, the converting circuit may be configured to operate even in the third phase, unlike the first mode.

The converting circuit may be configured to form a current path that varies according to a mode and a phase. A "current path" as used herein includes a circuit configuration for producing the voltage $V_X$ of the switching node. In addition, the control circuit may be configured to determine an ON/OFF state of each of a plurality of transistors according to a mode of the converting circuit and a phase corresponding to the mode, and determine a mode according to magnitudes of the input voltage $V_{IN}$ and the output voltage $V_{OUT}$. Details related to a mode operation of the converting circuit will be described later.

Referring to FIG. 4A, the converting circuit may be configured to operate in the first phase. In FIG. 4A, a circuit indicated by a thick line indicates an active portion of the converting circuit, and a circuit indicated by a thin line indicates an inactive portion of the converting circuit.

In an example embodiment, in the first phase, the converting circuit may be configured such that the first transistor $M_1$, the third transistor $M_3$, the sixth transistor $M_6$, and the eighth transistor $M_8$ are turned on and the second transistor $M_2$, the fourth transistor $M_4$, the fifth transistor $M_5$, and the seventh transistor $M_7$ are turned off. Accordingly, as shown in FIG. 4A, a portion indicated by a thick line in the converting circuit may be activated, and a portion indicated by a thin line may be inactivated. Accordingly, in the first phase, the converting circuit may be configured to output the output current $I_{OUT}$ using the first capacitor $C_1$ connected to the ground node, the inductor L connected to the first capacitor $C_1$ in series, and the second capacitor $C_2$ connected to an input source voltage according to an ON/OFF operation of each of the transistors $M_1$ to $M_8$.

Referring to FIG. 4B, the converting circuit may be configured to operate in the second phase. In FIG. 4B, a circuit indicated by a thick line indicates an active portion of the converting circuit, and a circuit indicated by a thin line indicates an inactive portion of the converting circuit.

In an example embodiment in the second phase, the converting circuit may be configured such that the second transistor $M_2$, the fourth transistor $M_4$, the fifth transistor $M_5$, and the seventh transistor $M_7$ are turned on and the first transistor $M_1$, the third transistor $M_3$, the sixth transistor $M_6$, and the eighth transistor $M_8$ are turned off. Accordingly, as illustrated in FIG. 4B, in the converting circuit, the portion indicated by the thick line may be activated and the portion indicated by the thin line may be inactivated. Accordingly, in the second phase, the converting circuit may be configured to output an output current using the second capacitor $C_2$ connected to the ground node, the first capacitor $C_1$ connected to the second capacitor $C_2$ in series, and the inductor L connected to the ground node according to an ON/OFF operation of each of the transistors $M_1$ to $M_8$.

Referring to FIG. 4C, the converting circuit may be configured to operate in the third phase. In FIG. 4C, a circuit indicated by a thick line indicates an activated portion of the converting circuit, and a circuit indicated by a thin line indicates an inactive portion of the converting circuit.

In an example embodiment, in the third phase, the converting circuit may be configured such that the second transistor $M_2$, the third transistor $M_3$, the fifth transistor $M_5$, and the seventh transistor $M_7$ are turned on and the first transistor $M_1$, the fourth transistor $M_4$, the sixth transistor $M_6$, and the eighth transistor $M_8$ are turned off. Accordingly, in the third phase, the converting circuit may be configured to output an output current using the first capacitor $C_1$ and the inductor L connected in parallel and the second capacitor $C_2$ connected to the ground node according to an ON/OFF operation of each of the transistors $M_1$ to $M_8$.

As described above, the converting circuit may operate in the first mode in which the converting circuit operates in any one of the first phase and the second phase.

In the first phase, a voltage $V_{C1}$ of the first capacitor is $V_{IN}$-$2V_{OUT}$. Also, in the second phase, the voltage $V_{C1}$ of the first capacitor is also $V_{IN}$-$2V_{OUT}$. Accordingly, the voltage $V_{C1}$ of the first capacitor is maintained in the first mode.

In the first phase, the converting circuit may output a current $I_L$ to the output node through the inductor L using the voltage charged in the first capacitor $C_1$ in the first phase. In addition, in the first phase, the converting circuit may be configured to connect the second capacitor $C_2$ between an input power source and an output node to charge a voltage of the second capacitor $C_2$ with $V_{IN}$-$V_{OUT}$ and output a current $I_C$ to the output node.

Further, in the second phase, the switching node may be connected to the ground node, and the first capacitor $C_1$ and the second capacitor $C_2$ may be connected in series between the input power source and the output node, whereby the voltage $V_{C1}$ of the first capacitor $C_1$ may be charged with $V_{IN}$-$2V_{OUT}$. In the second phase, current may be supplied to the output node using the inductor L, the first capacitor $C_1$, and the second capacitor $C_2$ at the same time, as in the first phase. Therefore, a voltage $V_X$ of the switching node may swing between 0 V (ground potential) and $V_{IN}$-$2V_{OUT}$ and a voltage difference between the voltage $V_{IN}$-$2V_{OUT}$ of the switching node and the output voltage $V_{OUT}$ may be less than a voltage difference between the input voltage $V_{IN}$ and the output voltage $V_{OUT}$, and thus, ripples of an inductor current may be reduced. In addition, in the first phase and the second phase, because current is divided and supplied to the output node using the first capacitor $C_1$ and the second capacitor $C_2$, the amount of current passing through the inductor is reduced. Accordingly, power loss due to parasitic resistance of the inductor greater than parasitic resistance of the capacitor may be reduced.

The converting circuit may operate in the second mode in which the converting circuit operates in any one of the first phase, the second phase, and the third phase.

The first and second phases of the second mode operate in the same manner as those in the first and second phases of the first mode.

In the third phase, because voltages of $V_{C2}$ and $V_{C1}$+$V_{OUT}$ are applied across the switching node of the converting circuit, the voltage $V_X$ of the switching node becomes $V_{IN}$-$V_{OUT}$. That is, in the third phase, the voltage $V_X$ of the switching node has a voltage value higher than the voltage $V_{IN}$-$2V_{OUT}$ of the switching node in the first phase and the second phase. Accordingly, the second mode may be used when a duty cycle needs to be increased above a threshold as an input voltage is decreased. When the duty cycle is close to 1, the circuit may become unstable for reasons such as capacitor balance, current balance, and so on, so it is necessary to limit the duty cycle. Here, a value set to limit the duty cycle may be referred to as a threshold.

Figure 5A:
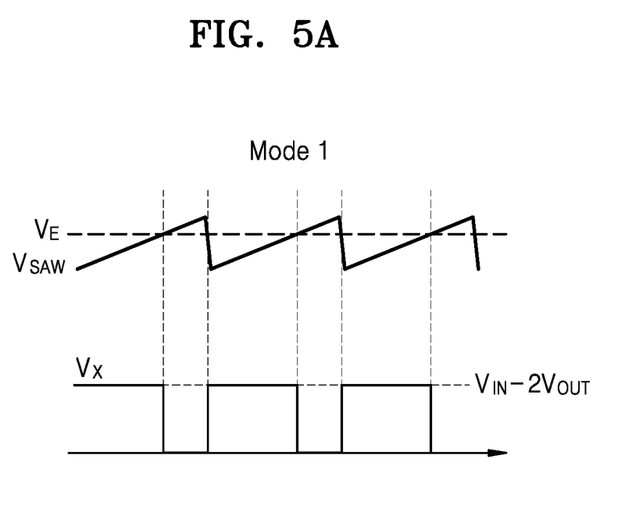
FIGS. 5A and 5B are views illustrating modes of a DC-DC buck converter according to an example embodiment.
Figure 5B:
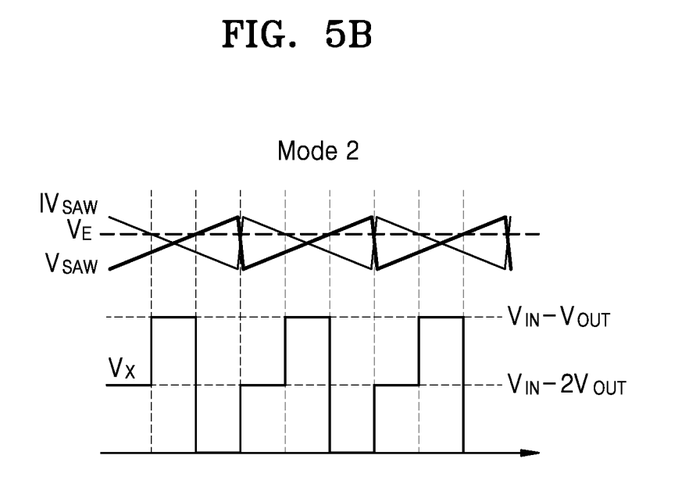

FIGS. 5A and 5B are view illustrating modes of a DC-DC buck converter according to an example embodiment.

Referring to FIG. 5A, when a level of the output signal from the error amplifier 330 is higher than a level of the sawtooth-shaped signal in the first mode, the converting circuit is energized, and when the level of the output signal from the error amplifier is lower than the level of the sawtooth-shaped signal, the converting circuit is de-energized.

As described above, in the first mode, the voltage $V_X$ of the switching node is $V_{IN}$-$2V_{OUT}$ in the first phase and 0 V in the second phase, so the voltage swings between 0 V and $V_{IN}$-$2V_{OUT}$.

Referring to FIG. 5B, in the second mode, as in the first mode, when the level of the output signal from the error amplifier 330 is higher than the level of the sawtooth-shaped signal, the converting circuit is energized, and when the level of the output signal from the error amplifier is lower than the level of the sawtooth-shaped signal, the converting circuit is de-energized.

However, unlike the first mode, in the second mode, the converting circuit may also operate in the third phase, and in the third phase, the voltage $V_X$ of the switching node is $V_{IN}$-$V_{OUT}$, and thus, as shown in FIG. 5B, the voltage $V_X$ at the switching node may be 0V, $V_{IN}$-$2_{OUT}$V, $V_{IN}$-$V_{OUT}$.

Also, referring to FIG. 5B, in the second mode, the converting circuit may be configured to operate in the third phase after operating in the first phase, operate in the second phase after operating in the third phase, and operate in the first phase after operating in the second phase.

Figure 6:
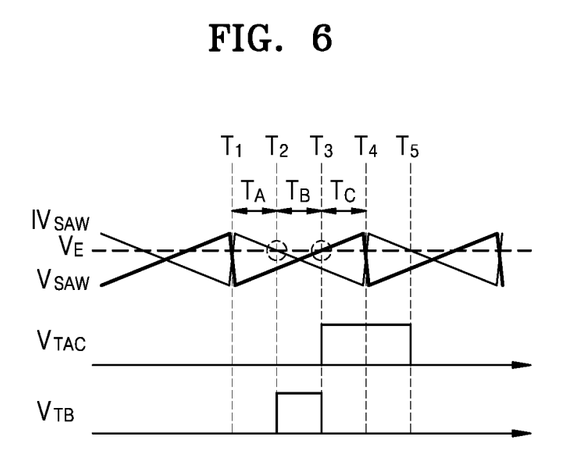
FIG. 6 is a view illustrating a method of operating a DC-DC buck converter according to an example embodiment.

FIG. 6 is a view illustrating a method of operating the DC-DC buck converter 100 according to an example embodiment.

The control circuit according to an example embodiment may determine a mode based on the input voltage $V_{IN}$ and the output voltage $V_{OUT}$.

Also, referring to FIG. 6, the control circuit according to an example embodiment may determine a mode based on the sawtooth-shaped signal $V_{SAW}$, the inverted sawtooth-shaped signal $IV_{SAW}$, and the output signal $V_E$ from the error amplifier.

As shown in FIG. 6, sections $T_A$, $T_B$, and $T_C$ are indicated. These sections are durations of time. The sections are divided by points in time (a left point in time $T_1$ of $T_A$, a left point $T_2$ in time of $T_B$, and points in time $T_3$ and $T_4$ of $T_C$) at which levels of the waveform signal $V_{SAW}$ and the output signal $V_E$ are the same and a point in time at which levels of the inverted sawtooth-shaped signal $IV_{SAW}$ and the output signal $V_E$ are the same. Also, the first phase may be operated in the section $T_A$, the third phase may be operated in the section $T_B$, and the second phase may be operated in the section $T_C$. In addition, $V_{TB}$ is a graph shown to easily recognize the section $T_B$, and $V_{T4C}$, extending from the point in time $T_3$ to a point in time $T_5$, is a graph shown by inverting $V_{TB}$.

As an example of a method of determining the mode, as described above, as the duty cycle approaches 1, the circuit may become unstable, so a threshold for the duty cycle may be set to 0.75. However, the threshold for the duty cycle is not limited thereto. The threshold of 0.75 corresponds to a case in which a ratio of $T_A$, $T_B$, and $T_C$ is 1:2:1 in order. Therefore, the mode may be switched based on a point at which $T_B=T_A+T_C$. For example, when the value of $T_B$ is greater than $T_A+T_C$, the first mode may be switched to the second mode.

In addition, the control circuit according to an example embodiment may be configured to determine a ratio of a time duration in which the first phase is maintained, a time duration in which the second phase is maintained, and a time duration in which the third phase is maintained based on an input voltage and an output voltage. In other words, the time durations in which the plurality of phases are maintained may be adaptively determined based on the input voltage and the output voltage, For example, when the output voltage is constant and the input voltage is gradually decreased, the period of $T_B$ may be widened as the level of $V_E$ increases, and accordingly, a proportion of the time duration in which the third phase is maintained may increase.

Figure 7:
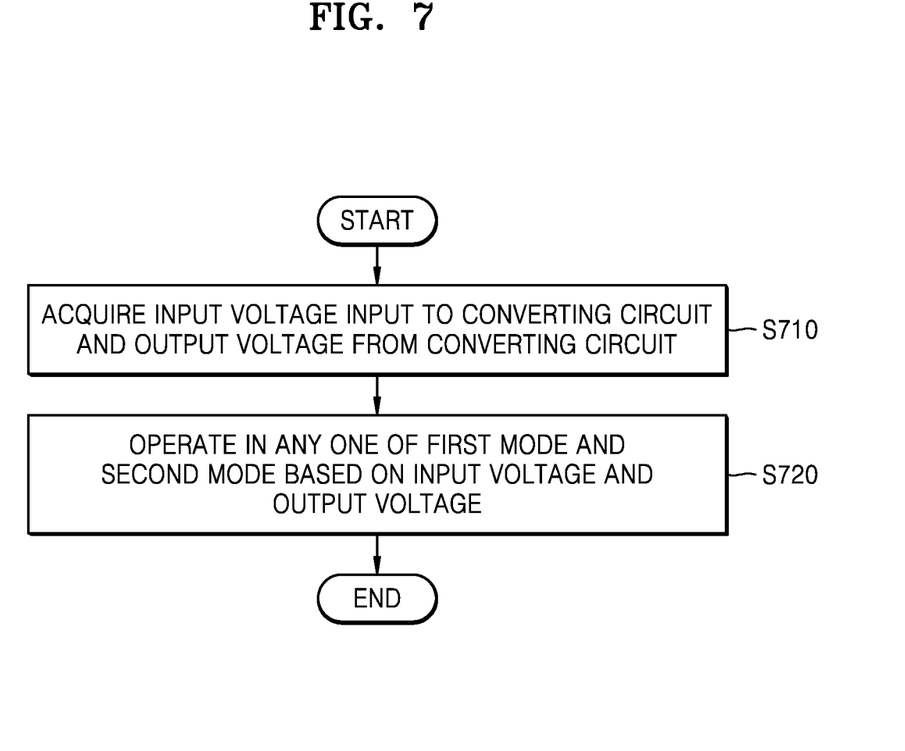
FIG. 7 is a flowchart illustrating a method of operating a DC-DC buck converter according to an example embodiment.

FIG. 7 is a flowchart illustrating a method of operating a DC-DC buck converter according to an example embodiment.

Referring to FIG. 7, the method of operating a DC-DC converter according to an example embodiment may include obtaining an input voltage input to a converting circuit and an output voltage from the converting circuit in operation S710.

In addition, the method of operating a DC-DC converter according to an example embodiment may include operating in any one of a first mode and a second mode based on the obtained input voltage and output voltage in operation S720.

Figure 8:
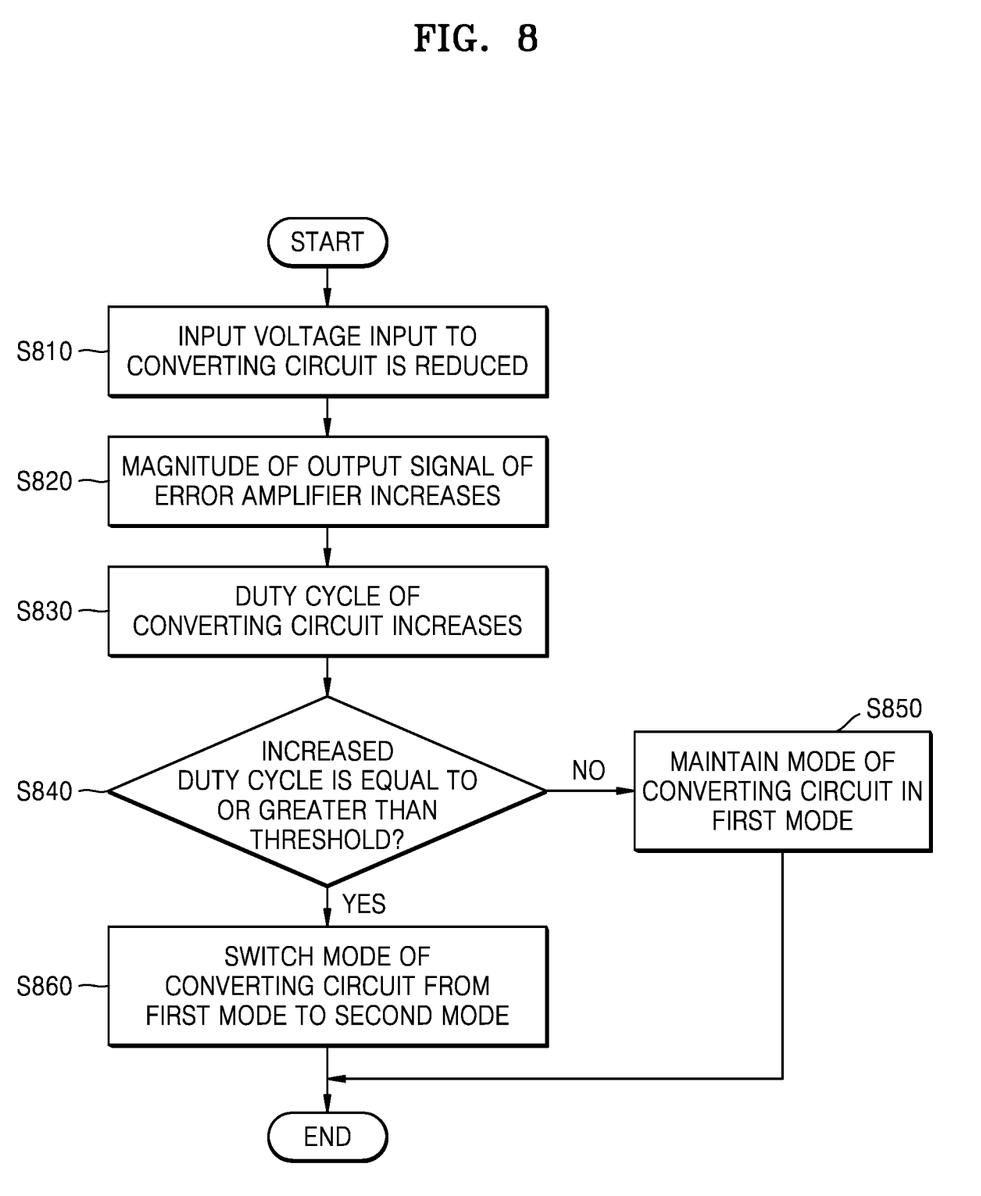
FIG. 8 is a flowchart illustrating an algorithm of a method of operating a DC-DC buck converter according to an example embodiment.

FIG. 8 is a flowchart illustrating an algorithm of a method of operating a DC-DC buck converter according to an example embodiment.

Referring to FIG. 8, a voltage input to the converting circuit may decrease (S810), and accordingly, a magnitude of an output signal of the error amplifier may increase (S820). Also, as the magnitude of the output signal of the error amplifier increases, a duty cycle of the converting circuit may increase (S830). If the increased duty cycle is less than a threshold, the control circuit may maintain the mode of the converting circuit in the first mode (S850), and if the increased duty cycle is greater than the threshold (S840), the control circuit may switch the mode of the converting circuit from the first mode to the second mode (S860).

Figure 9:
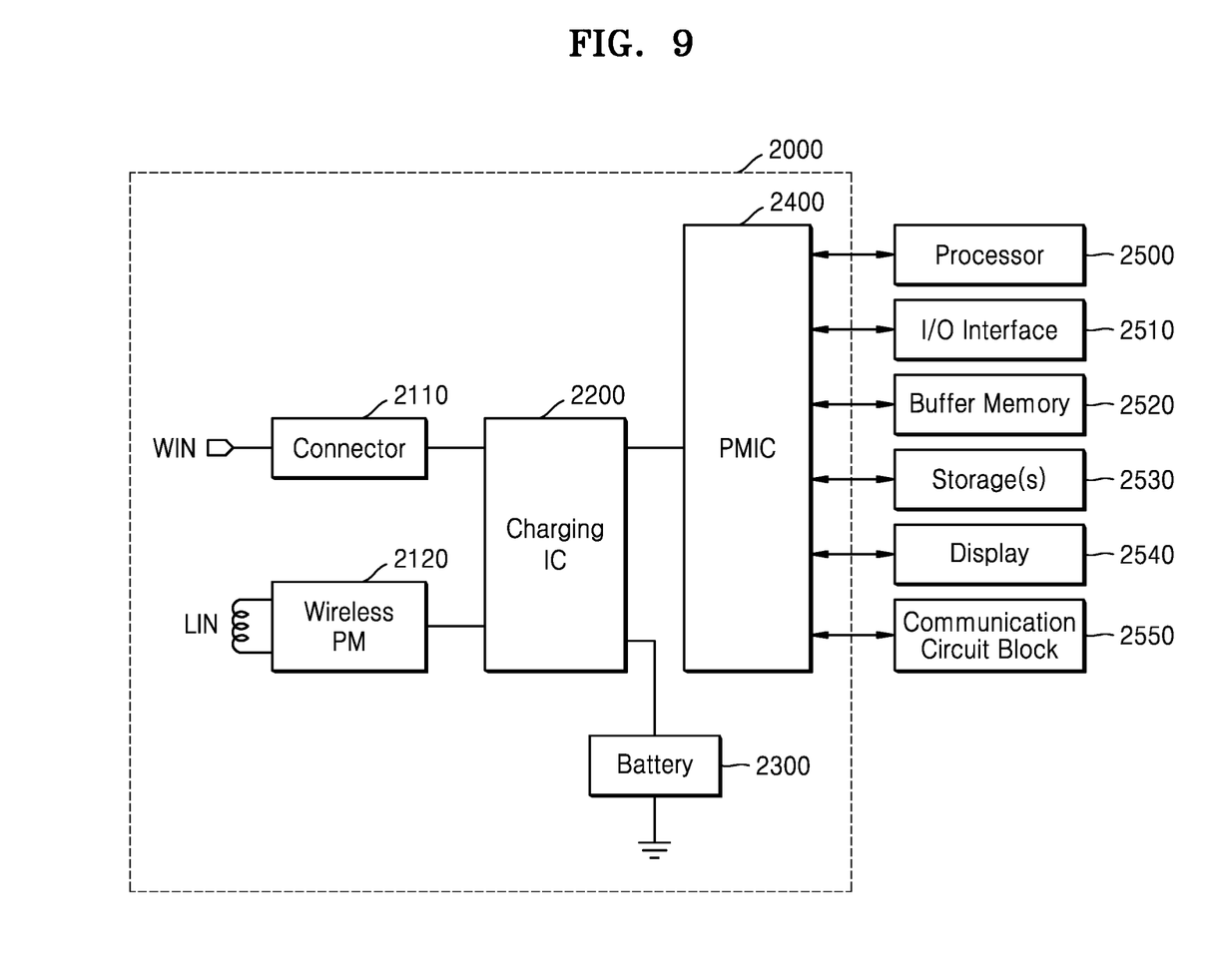
FIG. 9 is a block diagram illustrating a power system of a device according to an example embodiment.

FIG. 9 is a block diagram illustrating a power system 2000 of a device according to an example embodiment.

Referring to FIG. 9, the power system 2000 includes a connector 2110, a wireless power manager (PM) 2120, a charging integrated circuit (IC) 2200, a battery 2300, and a power management integrated circuit (PMIC) 2400.

The power system 2000 may be used to supply power to a device. The power system 2000 may receive power from a power source connected by wire through a conversion device such as an adapter. Alternatively, the power system 2000 may receive power from a power source connected wirelessly by resonance of an inductor. The power system 2000 may appropriately convert the received power. The power system 2000 may supply the converted power to components of the mobile electronic device.

For example, the connector 2110 may be connected to a conversion device such as an adapter through a wired input terminal WIN. The connector 2110 may receive power from a power source connected by wire. The connector 2110 may appropriately convert the received power and provide the converted power to the charging IC 2200.

For example, the wireless PM 2120 may be connected to an input inductor LIN. The input inductor LIN may resonate with a transmission inductor (not shown) of a wireless power transmitter. The wireless PM 2120 may receive power from a power source connected wirelessly by resonance between the input inductor LIN and the transmission inductor. The wireless PM 2120 may appropriately convert the received power and provide the converted power to the charging IC 2200.

The charging IC 2200 may operate in one of a battery power mode and a charging mode. For example, when power is not supplied through the connector 2110 and the wireless PM 2120, the battery power mode may operate. In the battery power mode, the charging IC 2200 may receive power from the battery 2300. The charging IC 2200 may provide, to the PMIC 2400, an output voltage generated by performing a conversion operation according to example embodiments in response to a change in a level of an input voltage provided from the battery 2300.

The charging IC 2200 may receive power from at least one of the connector 2110 and the wireless PM 2120. For example, when power is provided through at least one of the connector 2110 and the wireless PM 2120, the charging IC 2200 may operate in the charging mode. In the charging mode, the charging IC 2200 may provide, to the battery 2300, an output voltage generated by performing a conversion operation according to example embodiments in response to the change in the level of the input voltage provided through the connector 2110 or the wireless PM 2120. In addition, the charging IC 2200 may provide the converted output voltage to the PMIC 2400.

The PMIC 2400 may receive the input voltage from the charging IC 2200. For example, the PMIC 2400 may provide, to other components of a mobile electronic device, an output voltage generated by performing a conversion operation on the input voltage provided from the charging IC 2200 according to example embodiments. For example, each of a processor 2500, an input/output (I/O) interface 2510, a buffer memory 2520, a storage 2530, a display 2540, and a communication circuit block 2550 included in the mobile electronic device may operate using the output voltage provided from the PMIC 2400.

While example embodiments been particularly shown and described, it will be understood that various changes in form and details may be made therein without departing from the spirit and scope of the present disclosure as defined in the following claims.

What is claimed is:

1. A DC-DC buck converter for generating an output voltage by stepping down an input voltage, the DC-DC buck converter comprising:
   a converting circuit including a plurality of transistors, a first capacitor, a second capacitor, and an inductor, the converting circuit being configured to form a current path that varies according to a plurality of modes and a plurality of phases; and
   a control circuit configured to:
      determine a mode of the converting circuit, from among the plurality of modes, according to a first amplitude of the input voltage and a second amplitude of the output voltage, and
      determine an ON/OFF state of each transistor of the plurality of transistors according to the determined mode and a phase from among the plurality of phases.

2. The DC-DC buck converter of claim 1, wherein the plurality of modes comprises a first mode and a second mode, the plurality of phases comprises a first phase, a second phase, and a third phase, and
   wherein the converting circuit is further configured to:
      operate, while in the first mode, in any one of the first phase or the second phase,
      operate, while in the second mode, in any one of the first phase, the second phase, or the third phase, and
      output an output current using the first capacitor, the second capacitor, and the inductor in each of the first phase, the second phase, and the third phase.

3. The DC-DC buck converter of claim 2, wherein the converting circuit is further configured to form the current path via the first capacitor connected to a ground node, the inductor connected to the first capacitor in series, and the second capacitor connected to an input source voltage according to an ON/OFF operation of each of the plurality of transistors in the first phase,
   form the current path via the second capacitor connected to the ground node, the first capacitor connected to the second capacitor in series, and the inductor connected to the ground node according to the ON/OFF operation of each of the plurality of transistors in the second phase, and
   form the current path via the first capacitor and the inductor connected in parallel and the second capacitor connected to the ground node according to the ON/OFF operation of the plurality of transistors in the third phase.

4. The DC-DC buck converter of claim 2, wherein in the first phase, a voltage value of a switching node connected to the inductor is a first value obtained by subtracting double the output voltage from the input voltage,
   in the second phase, the voltage value of the switching node is 0 V, and
   in the third phase, the voltage value of the switching node is a second value obtained by subtracting the output voltage from the input voltage.

5. The DC-DC buck converter of claim 2, wherein the converting circuit is further configured to, in the second mode, operate in the third phase after operating in the first phase, operate in the second phase after operating in the third phase, and operate in the first phase after operating in the second phase.

6. The DC-DC buck converter of claim 2, wherein the control circuit is further configured to determine, based on the input voltage and the output voltage, a first time duration in which the first phase is maintained, a second time duration in which the second phase is maintained, and a third time duration in which the third phase is maintained.

7. The DC-DC buck converter of claim 2, wherein the control circuit comprises:
   a first comparator;
   a second comparator; and
   a compensator including an error amplifier, and
   wherein the first comparator is configured to receive a reference signal and an output signal from the error amplifier, and
   wherein the second comparator is configured to receive an inverted reference signal having a vertically inverted waveform based on a waveform of the reference signal and the output signal from the error amplifier.

8. The DC-DC buck converter of claim 7, wherein the reference signal is a sawtooth-shaped signal,
   wherein the inverted reference signal is an inverted sawtooth-shaped signal having the vertically inverted waveform based on the waveform of the sawtooth-shaped signal, and
   wherein the control circuit is further configured to determine whether the converting circuit is to operate in the first mode or the second mode based on the sawtooth-shaped signal, the inverted sawtooth-shaped signal, and the output signal from the error amplifier.

9. The DC-DC buck converter of claim 8, wherein the control circuit is further configured to determine the mode is the first mode or the second mode based on a ratio of sections delineated by points in time at which a first magnitude of the sawtooth-shaped signal and a second magnitude of the output signal from the error amplifier are equal and points in time at which a third magnitude of the inverted sawtooth-shaped signal and the second magnitude of the output signal from the error amplifier are equal within one cycle of the sawtooth-shaped signal.

10. The DC-DC buck converter of claim 9, wherein the control circuit is further configured such that the second magnitude of the output signal from the error amplifier increases as a conversion ratio of the output voltage with respect to the input voltage increases, and a proportion of a time duration in which the third phase is maintained increases in response thereto.

11. The DC-DC buck converter of claim 7, wherein the control circuit is further configured to switch from the first mode to the second mode when a duty cycle of the converting circuit is determined to be equal to or greater than a threshold.

12. A DC-DC buck converter comprising:
a first transistor connected between an input power source and a first node;
a second transistor connected between the first node and a second node;
a third transistor connected between the second node and a switching node;
a fourth transistor connected between the switching node and a ground node;
a fifth transistor connected between a third node and the ground node;
a sixth transistor connected between the third node and a fourth node;
a seventh transistor connected between the fourth node and a fifth node;
an eighth transistor connected between the fifth node and the ground node;
a first capacitor connected between the second node and the fifth node;
a second capacitor connected between the first node and the third node; and
an inductor connected between the switching node and an output node.

13. The DC-DC buck converter of claim 12, wherein the DC-DC buck converter is configured to operate in any one of a plurality of phases,
wherein in a first phase of the plurality of phases, the first transistor, the third transistor, the sixth transistor, and the eighth transistor are configured to be turned on, and the second transistor, the fourth transistor, the fifth transistor, and the seventh transistor are configured to be turned off, and
wherein in a second phase of the plurality of phases, the second transistor, the fourth transistor, the fifth transistor, and the seventh transistor are configured to be turned on, and the first transistor, the third transistor, the sixth transistor, and the eighth transistor are configured to be turned off.

14. The DC-DC buck converter of claim 13, wherein in a third phase of the plurality of phases, the second transistor, the third transistor, the fifth transistor, and the seventh transistor are configured to be turned on, and the first transistor, the fourth transistor, the sixth transistor, and the eighth transistor are configured to be turned off.

15. The DC-DC buck converter of claim 12, further comprising:
a compensator connected to the output node and including an error amplifier;
a first comparator connected to the compensator; and
a second comparator connected to the compensator.

16. A method of operating a DC-DC buck converter generating an output voltage by stepping down an input voltage, the method comprising:
inputting the input voltage to a converting circuit, the converting circuit including a plurality of transistors, a first capacitor, a second capacitor, and an inductor; and
operating the converting circuit in any one of a first mode or a second mode based on the input voltage and the output voltage of the converting circuit,
wherein the operating comprises:
operating based on a first phase and a second phase as a first period in the first mode, and
operating based on a plurality of phases including the first phase, the second phase, and a third phase, as a second period, in the second mode.

17. The method of claim 16, wherein the inductor is coupled between a switching node and an output node of the converting circuit,
wherein in the first phase, a voltage value of the switching node is a first value obtained by subtracting double the output voltage from the input voltage,
wherein in the second phase, the voltage value of the switching node is 0 V, and
wherein in the third phase, the voltage value of the switching node is a second value obtained by subtracting the output voltage from the input voltage.

18. The method of claim 16, wherein the operating further comprises forming a current path by determining an ON/OFF state of each of the plurality of transistors according to a mode from among the first mode and the second mode and a phase from among the plurality of phases.

19. The method of claim 16, wherein the operating further comprises determining whether to operate in the first mode or the second mode based on a sawtooth-shaped signal, an inverted sawtooth-shaped signal having a vertically inverted waveform based on the sawtooth-shaped signal, and an output signal from an error amplifier.

20. The method of claim 19, wherein the operating further comprises determining a first operating section of each of the first phase and the second phase in the first mode and determining a second operating section of each of the first phase, the second phase, and the third phase in the second mode, based on the sawtooth-shaped signal, the inverted sawtooth-shaped signal, and the output signal from the error amplifier.

* * * * *